(12) United States Patent
Wall

(10) Patent No.: US 6,640,086 B2
(45) Date of Patent: Oct. 28, 2003

(54) METHOD AND APPARATUS FOR CREATING AND DISTRIBUTING REAL-TIME INTERACTIVE MEDIA CONTENT THROUGH WIRELESS COMMUNICATION NETWORKS AND THE INTERNET

(76) Inventor: Corbett Wall, 3/f. 8 Nan-king East Road, Sec. 5, Taipei (TW)

( * ) Notice: Subject to any disclaimer, the term of this patent is extended or adjusted under 35 U.S.C. 154(b) by 12 days.

(21) Appl. No.: 09/963,348

(22) Filed: Sep. 25, 2001

(65) Prior Publication Data

US 2003/0027591 A1 Feb. 6, 2003

(30) Foreign Application Priority Data

May 15, 2001 (TW) ........................................ 90111564 A

(51) Int. Cl.[7] ................................................ H04H 1/00
(52) U.S. Cl. ...................... 455/3.04; 455/556; 455/566; 455/466; 348/14.01; 348/14.02
(58) Field of Search ................................ 455/550, 556, 455/557, 566, 403, 466, 413, 414, 3.01, 3.03, 3.04, 3.05, 3.06; 348/14.01, 14.02, 14.03, 14.08, 14.09

(56) References Cited

U.S. PATENT DOCUMENTS

| | | | |
|---|---|---|---|
| 5,588,842 A | * 12/1996 | Nishimura et al. | 434/307 A |
| 5,613,192 A | * 3/1997 | Ikami et al. | 725/114 |
| 6,083,009 A | * 7/2000 | Kim et al. | 434/307 A |
| 6,331,669 B1 | * 12/2001 | Lee et al. | 84/609 |
| 2002/0188447 A1 | * 12/2002 | Coon et al. | 704/249 |
| 2003/0013483 A1 | * 1/2003 | Ausems et al. | 455/556 |

FOREIGN PATENT DOCUMENTS

| | | | |
|---|---|---|---|
| JP | 2001-211485 | * | 8/2001 |
| JP | 2001-339487 | * | 12/2001 |
| WO | WO 99/12153 A | * | 3/1999 |
| WO | WO 01/93261 A | * | 12/2001 |

OTHER PUBLICATIONS

Song–Yi Yi; Heonshik Shin "Design of a real–time trader for mobile objects in open distributed environments" Real–Time Systems, 1996., Proceedings of the Eighth Euromicro Workshop on, Jun. 1996, pp. 212–217.*

* cited by examiner

Primary Examiner—Nay Maung
Assistant Examiner—Edan Orgad
(74) Attorney, Agent, or Firm—David N. Lathrop, Esq.; Gallagher & Lathrop

(57) ABSTRACT

Using an apparatus like a cellular telephone, an operator is able to create a message by singing into the apparatus or by pressing buttons on the apparatus as he listens to background music presented by the apparatus. By pressing buttons, the operator is able to generate sounds as if he was playing a musical instrument. A remote server stores a representation of the operator vocal or tactile input, and sends a message to one or more recipients that renders the operator input and background music in a manner that substantially preserves the temporal relationship originally observed by the operator.

34 Claims, 3 Drawing Sheets

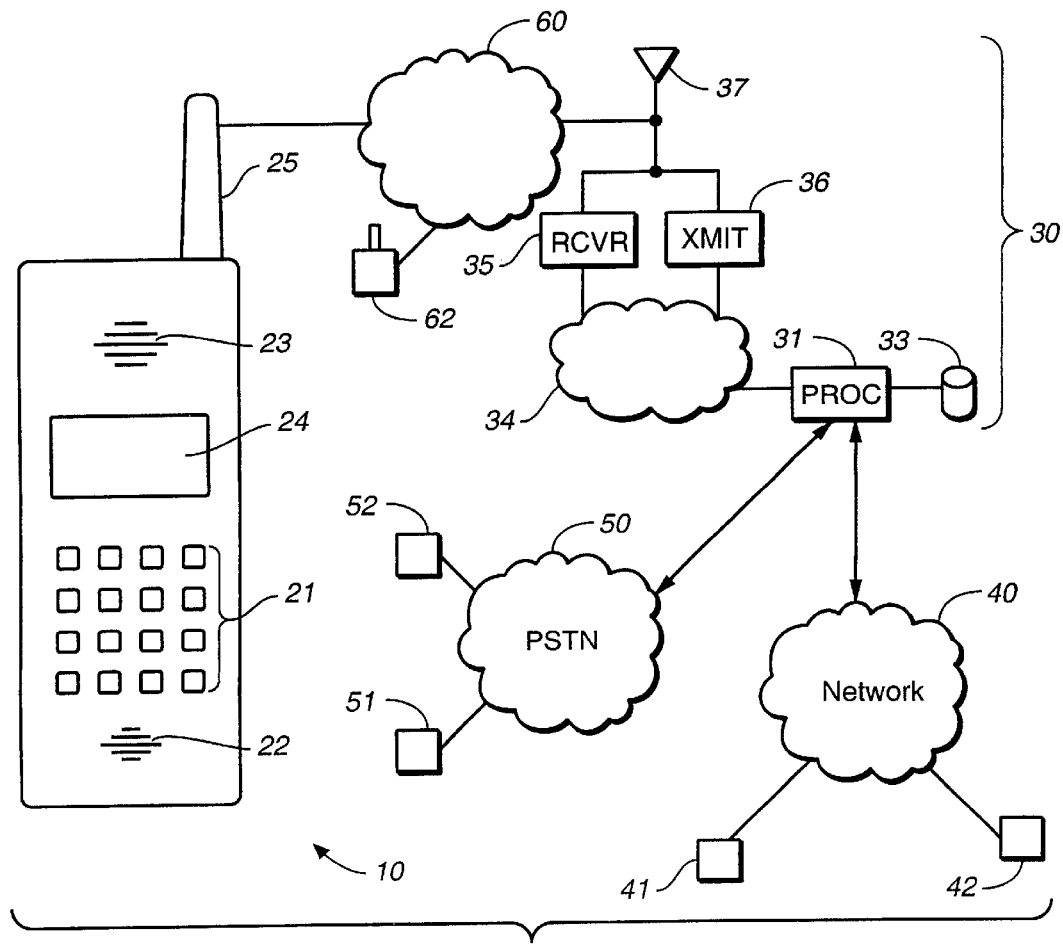
FIG._1
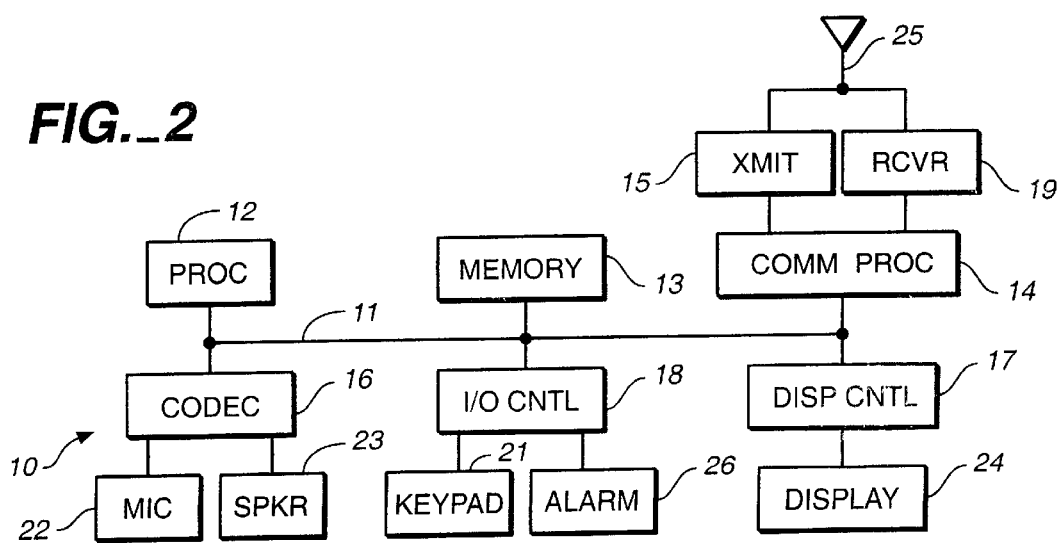
FIG._2

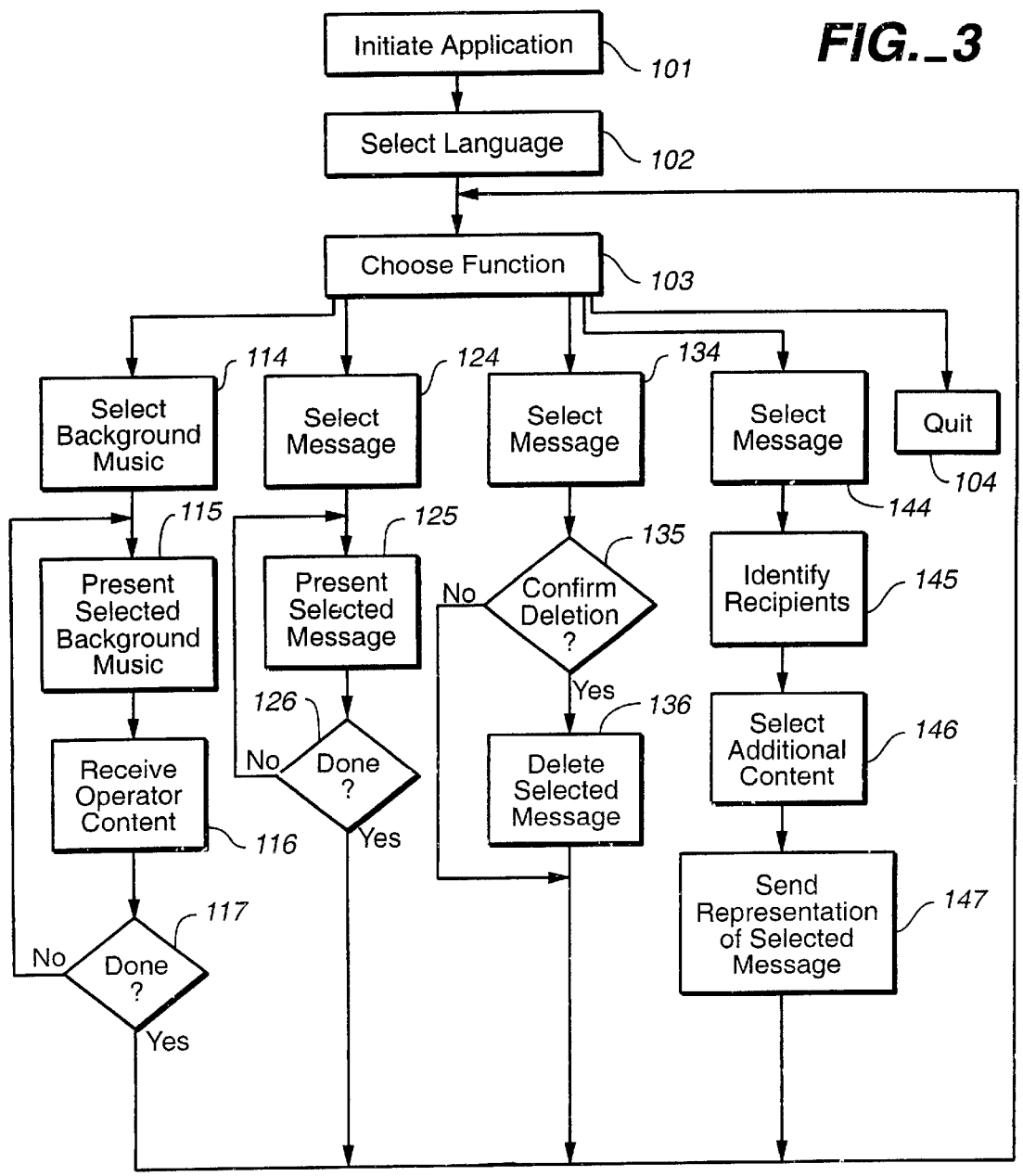
FIG._3

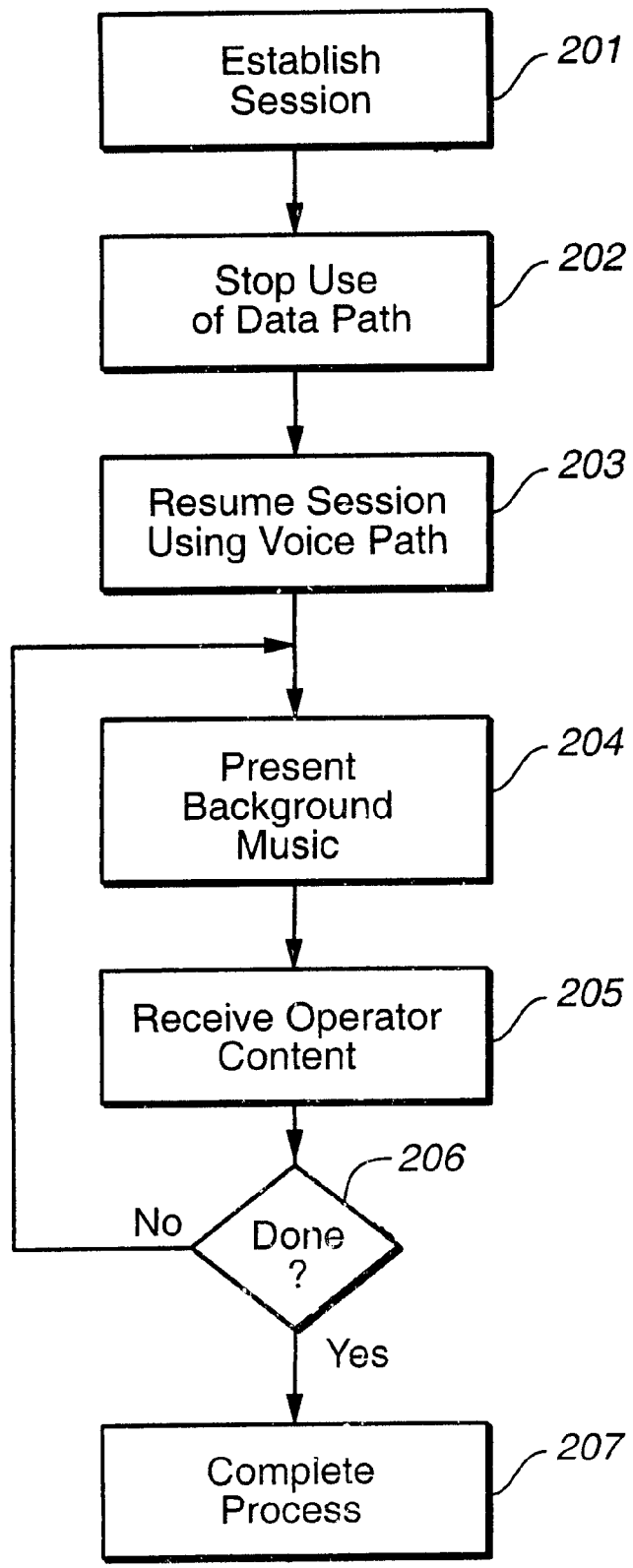
FIG._4

METHOD AND APPARATUS FOR CREATING AND DISTRIBUTING REAL-TIME INTERACTIVE MEDIA CONTENT THROUGH WIRELESS COMMUNICATION NETWORKS AND THE INTERNET

TECHNICAL FIELD

The present invention is related to the generation and distribution of messages using computers and networks, and pertains more specifically to methods and systems that allow an operator to distribute messages having aural or visual content that is generated by the operator using handheld apparatuses such as mobile telephones.

BACKGROUND ART

The use of mobile apparatuses like cellular telephones, so called Personal Digital Assistants (PDA) and handheld computers is growing at rates that greatly exceed even the most optimistic predictions of only a few years ago. Cellular telephones have been widely accepted because they are inexpensive and allow individuals to move about freely yet stay in contact with friends and sources of entertainment. Other mobile apparatuses like those that play and record music or moving pictures, for example, also have been widely accepted because they provide entertainment and allow individuals to have fun.

These mobile apparatuses are used throughout the world by individuals of all ages but they are especially popular among individuals that embrace "pop culture" trends and lifestyles. The pop culture appeals to a large segment of the population, especially among youth, and is readily accepted throughout the world.

Music and moving pictures that are recorded and distributed by professional sources is an important part of the pop culture. There is, however, a growing interest by individuals to create their own aural or visual content and then share it with friends. Unfortunately, creation and distribution of aural and visual content like music and motion pictures has required the use of apparatuses that are not portable or cannot be carried as easily as a cellular telephone. What is needed is the ability to create and distribute aural and/or visual content using mobile apparatuses like cellular telephones.

DISCLOSURE OF INVENTION

An object of the present invention is to provide for the creation and distribution of content like music or motion pictures using mobile apparatuses.

According to one aspect of the present invention, an operator uses a handheld apparatus to receive instructions and a presentation of a representation of first content, provide via the handheld apparatus an identification of one or more recipients and a second content that overlaps in time with the presentation of first content according to a temporal relationship controlled by the operator, send a representation of the second content and identification of recipients to a remote server, and cause the remote server to send to the one or more recipients a message representing the first content and the second content arranged according to the temporal relationship.

According to another aspect of the present invention, a system includes a handheld apparatus having a wireless transmitter and processing circuitry that causes the handheld apparatus to provide to the operator output representing instructions and a presentation of first content, receive from the operator input representing an identification of one or more recipients and second content that overlaps in time with the presentation of the first content according to a temporal relationship controlled by the operator, and send through the wireless transmitter a representation of the second content and identification of one or more recipients; and includes a server subsystem that receives and stores the representation of second content and identification of the one or more recipients, and sends to the one or more recipients a message representing the first content and the second content arranged according to the temporal relationship.

According to yet another aspect of the present invention, a server system that receives one or more signals from a handheld apparatus generated under control of an operator of the handheld apparatus that convey an identification of first content, second content that overlaps in time with a presentation by the handheld apparatus of the first content according to a temporal relationship that is controlled by the operator, and an identification of one or more recipients, obtains information that identifies the temporal relationship, and sends to the one or more recipients a message that represents the first content and the second content arranged according to the temporal relationship.

The various features of the present invention and its preferred implementations may be better understood by referring to the following discussion and the accompanying drawings in which like reference numerals refer to like elements in the several figures. The contents of the following discussion and the drawings are set forth as examples only and should not be understood to represent limitations upon the scope of the present invention.

BRIEF DESCRIPTION OF DRAWINGS

FIG. 1 is a schematic block diagram of a system in which the operator of a handheld telephone may interact with a server that is connected to a variety of networks and communication paths.

FIG. 2 is a schematic block diagram of major components in one hypothetical implementation of a handheld telephone.

FIG. 3 illustrates a process that allows an individual to create and distribute messages with aural content using an apparatus like a cellular telephone or PDA.

FIG. 4 illustrates a process that allows an individual to create and distribute messages with aural content using non-concurrent data and voice communication paths.

MODES FOR CARRYING OUT THE INVENTION

A. Overview

FIG. 1 is a schematic illustration of a system in which the operator of mobile apparatus 10 may interact with server 30 to generate messages having a combination of original and pre-existing aural and/or visual content and to control the distribution of these messages to one or more recipients such as recipients 42, 52, 62.

The following discussion refers more particularly to cellular telephones, the public switched telephone network (PSTN), and the internet. These facilities are important examples of how the present invention may be used, but the present invention may be implemented and used with a much wider range of facilities than just these particular examples. A cellular telephone is merely one example of an apparatus that may be used for apparatus 10. Other examples of suitable apparatuses include a PDA, a portable computer including handheld computers, and two-way radios. Teachings of the present invention may also be applied to stationary or desktop telephones and stationary or desktop computers. Cellular technology conforming to either existing or anticipated standards is one type of communication technology that may be used with apparatus 10. The internet and PSTN are examples of facilities that may be used to provide communication between system components. Essentially any facility or technology may be used including broadcasting, point-to-point and multi-point communication channels that carry ultrasonic, radio, or optical signals through the air or along transmission media such as wires or optical fibers.

1. Applications

Two applications of the present invention are referred to herein as SongMail and MusicDIY (do it yourself). SongMail and Music DIY allow an operator of apparatus 10 to create a message that includes pre-existing content, such as background music, and additional content provided by the operator, and then send that message to one or more recipients in a form that allows the recipients to hear the content. In the SongMail application, the operator provides acoustic content such as vocal utterances. In the MusicDIY application, the operator provides aural content by actuating one or more input devices of apparatus 10 in a manner that is similar to playing a musical instrument.

SongMail and MusicDIY are related to aural content; however, the present invention may be used to create messages that contain representations of essentially any content, including visual content, that can be perceived by the recipients. Furthermore, the SongMail and MusicDIY applications themselves can be extended to include visual content, for example. These applications are discussed below in more detail and are presented only as examples of applications that can be provided by the present invention.

2. Communication

Referring to FIG. 1, a system that incorporates various features of the present invention includes communication facilities between server 30 and apparatus 10, and between server 30 and potential recipients such as computer system 42, telephone 52, and mobile device 62. A system may also include communication facilities between server 30 and the providers of services or content, which are represented by computer system 41 and telephone 51. For example, server 30 may obtain pre-existing content from computer system 41 that is not available from its own content database on storage device 33.

Communication facilities between server 30 and apparatus 10 are used by the operator of apparatus 10 to create and send a message to server 30, which subsequently sends the message to one or more recipients. Communication facilities between server 30 and the recipients are used by the server to distribute that message to the recipients. Communication facilities between server 30 and the providers of services or content such as pre-recorded music or motion pictures are used by server 30 to obtain those services or content.

A wide variety of communication technologies, techniques and protocols can be used. No particular communication facilities are critical; however, it is anticipated that the facilities illustrated in FIG. 1 will be commercially important for many implementations of the present invention.

3. Server

Server 30 may be implemented by conventional hardware including processor 31, storage device 33, and connections to communication facilities like PSTN 50, a cellular telephone system, and network 40. Network 40 may be a global network such as the Internet, or it may be a more limited network such as a company intranet.

An environment that supports various applications discussed below may be provided by an operating system such as those known as Linux, Unix, or various versions of Windows. No particular software environment is essential to practice the present invention. The representation of server 30 in FIG. 1 suggests one computer system having a single processor 31; however, server 30 may be implemented by one or more computer systems each having single or multiple processors. These systems may be located in close proximity to one another or they may be widely separated. No particular implementation or configuration is critical.

Server 30 provides a number of services that are used to implement the SongMail and MusicDIY applications mentioned above. Examples of some services that may be provided by server 30 in various implementations of the present invention include electronic mail (e-mail), Interactive Voice Response (IVR), Short Message Services (SMS) or Multimedia Messaging Service (MMS), Wireless Access Protocol (WAP) and Hypertext Transfer Protocol (HTTP). These services are examples of presently known services that are likely to be replaced by corresponding future services that will be more advanced. Server 30, according to the teachings of the present invention, may provide or work with existing and future versions of these types of services.

Storage device 33, which may include multiple devices, stores operating system and application system software executed by processor 31 and stores data used by this software. Three examples of data are operator profiles, a content database, and messages generated by an operator. An operator profile may contain data like accounting information and individual preferences that are associated with a particular operator. An example of an operator preference would be an indication of a favorite type of music or recording artist. An operator profile can also include an "address book" of potential recipients. A content database contains pre-existing content that an operator can select to include in a message with the operator's own content. Preferably, the database is arranged to facilitate selection by artist, title, type or style of content, or the basic message or mood that is conveyed by the content.

Server 30 may use essentially any form of communication with other components of the system. In the implementation shown in FIG. 1, server 30 communicates with mobile apparatuses 10, 62 through radio channels 60, communicates with telephones 51, 52 through PSTN 50, and communicates with computer systems 41, 42 through network 40. Signals are sent and received through radio channels 60 by receiver 35 and transmitter 36, respectively, which are connected to one or more antennas 37, and which are connected to processor 31 by communication facility 34. Receiver 35 and transmitter 36 may be located in close proximity to processor 31 or they may be widely separated. In one implementation, communication facility 34 provides a connection to a cellular telephone system that includes multiple receivers 35, multiple transmitters 36, and multiple antennas 37.

For ease of discussion, the following description will refer to an implementation in which server 30 is implemented by a single computer system having one processor 31 that is connected to one storage device 33, to PSTN 50, to network 40, to receiver 35 and to transmitter 36. Many variations in implementation and configuration are possible.

4. Handheld Apparatus

The illustration of mobile apparatus 10 in FIG. 1 suggests a cellular telephone; however, other types of apparatuses may be used as explained above. In the particular example shown, apparatus 10 has multiple input devices and multiple output devices. The input devices include an array of switches 21 such as a keypad that may be activated by an operator, and acoustic input transducer 22 such as a microphone into which the operator may speak or provide other acoustic input. The output devices include an acoustic output transducer 23 such as a loudspeaker, and a visual display 24 such as a liquid crystal display (LCD) panel through which visual information may be presented. In another implementation not shown, apparatus 10 is a PDA that has an array of switches 21 for input and a visual display 24 for output, but may not have any acoustic input or output transducers.

A hypothetical implementation of apparatus 10 as a cellular telephone is shown schematically in FIG. 2. In this implementation, processor 12 represents circuitry that provides computing resources. Memory 13 represents circuitry that provides volatile and non-volatile information storage such as random access memory and various types of read only memory. Input/output control 18 represents an interface to input and output devices like array of switches 21 (keypad) and acoustic output transducer 26 (piezoelectric device). Display control 17 represents an interface to display device 24 (LCD panel). Codec 16 represents circuitry that provides encoding and decoding of audio signals received from acoustic input transducer 22 (microphone) and sent to acoustic output transducer 23 (loudspeaker). Communication processor 14 represents an interface to transmitter 15 and receiver 19, which are coupled to antenna 25, that send and receive signals through radio channels 60. In the example shown in the figure, various components of apparatus 10 connect to bus 11, which may represent more than one physical bus. Other implementations may be realized using an architecture other than a bus architecture.

In an alternative implementation of a PDA, for example, various components such as codec 16, acoustic input transducer 22 and acoustic output transducer 23 may be omitted and other components such as communication processor 14, transmitter 15, receiver 19 and antenna 25 may be provided by an apparatus that is external to and distinct from apparatus 10. Many variations are possible.

The functions of one or more of these components can be implemented in a wide variety of ways including discrete logic components, one or more ASICs and/or program-controlled processors. The type of implementation is not critical.

Several components that may be important in a practical implementation, such as an antenna duplexor and power management circuitry, are not important in principle to the present invention and are omitted from the drawing to improve illustrative clarity.

B. Applications

Many details of implementation for the SongMail and MusicDIY applications depend in part on the characteristics of apparatus 10 and the communication technologies that are used to link apparatus 10, server 30 and the recipients. This section of the description provides a conceptual overview of each application that omits detailed considerations that may be needed for actual implementations. Additional considerations are discussed below in context with a description of various implementation technologies.

1. SongMail

An operator may create a SongMail message using a telephone or other apparatus having acoustic input and output transducers. Preferably, the telephone has an array of switches 21 that can be actuated by pressing a corresponding array of buttons, an acoustic input transducer 22 such as a microphone, an acoustic output transducer 23 such as a loudspeaker, and a rasterized visual display device 24 such as an LCD panel. The operator initiates a SongMail process by, for example, pressing one or more buttons of apparatus 10. Apparatus 10 uses one or more of its output devices to present prompts or other information that guide the operator through the SongMail process, such as by presenting aural information through acoustic output transducer 23 or, preferably, presenting visual information through display device 24. If apparatus 10 is a typical mobile telephone, for example, visual display device 24 may provide only a conventional display of telephone numbers entered by the operator to assist the operator in setting up voice communication paths, as discussed below. In response, the operator uses one or more of the input devices of apparatus 10 to control the creation and distribution of the message. For example, vocal input could be provided through acoustic input transducer 22 or, preferably, tactile input could be provided by pressing buttons to actuate one or more switches in the array of switches 21.

a) Setup

The steps in one conceptual implementation of the SongMail process is shown in FIG. 3. In step 101 of this process, the operator initiates the SongMail application in whatever manner is appropriate for the particular implementation. In step 102, the operator selects a language for the system to use in providing prompts or other information to guide the operator through the process. In step 103, the operator may choose to: (1) create a new message, (2) listen to a previously created message, (3) delete a previously created message, (4) send a previously created message, or (5) quit. In preferred implementations, the options to listen, delete or send messages are not offered if there are no previously created messages. If the operator elects to create a new message, the process continues with step 114. If the operator elects to listen to a previously created message, the process continues with step 124. If the operator elects to delete a previously created message, the process continues with step 134. If the operator elects to send a previously created message, the process continues with step 144. If the operator elects to quit, the process continues with step 104, which performs the acts needed to stop the process.

b) Create

In step 114, the operator selects "background music" for his message. In preferred implementations, the operator is able to select the background music by title, artist, type of music, or the message or mood that is conveyed by the music. The system may also present to the operator only some of the content available in a content database that has been filtered and arranged according to operator preferences stored on storage device 33.

The term "background music" is used to refer to pre-existing content provided by the system as opposed to "operator content" that is provided by the operator. This pre-existing content need not be background music but such music is likely to be a popular choice. In one implementation, server 30 stores pre-existing content in a database on storage device 33 and sends operator-selected content to apparatus 10. In another implementation, the pre-existing content is stored in apparatus 10, such as by a removable solid-state memory device.

In step 115, the system presents a rendition of the selected background music through acoustic output transducer 23, and receives operator content from the operator through acoustic input transducer 22. Step 116 allows the operator to sing, for example, while listening to the background music. This allows the operator to provide operator content that overlaps in time with the presentation of the background music and to control the temporal relationship of this overlap.

Steps 115 and 116 reiterate until step 117 determines that the creation of operator content is complete. The process then continues with step 103. Alternatively, the method may continue with steps that allow the operator to identify one or more recipients and to send a message with the just-created operator content to those recipients. One way in which a message may be sent is described below. Preferably, if the method proceeds directly to steps that allow the operator to send a message, a step is provided that allows the operator to refrain from sending the message.

Preferably, server 30 stores on storage device 30 a representation of the message that includes the operator content but does not include the background music selected by the operator. Server 30 stores only an identification of the selected background music and an indication of the temporal relationship between these two contents. The background music itself is stored elsewhere in a content database. When the message is sent to a recipient or to the operator for review, presentations of background music and operator content are combined in a manner that substantially preserves the temporal relationship between these two contents that was observed by the operator when the operator content was provided.

When certain technologies like cellular telephone systems are used to send the selected background music to apparatus 10 for presentation to the operator, and to receive the operator content from apparatus 10, significant delays in transmission generally occur. Unless these delays can be determined, server 10 cannot determine the temporal relationship between the operator content and the presentation of the background music and, therefore, cannot preserve this relationship when the message is sent to a recipient. A few ways in which these delays may be determined are discussed in the following paragraphs. In principle, the way in which these delays are determined is not critical to the present invention.

If the operator is using a communication service like a cellular telephone service and the provider of that service can furnish an estimate of the transmission delays, then the estimated roundtrip delay can be used to estimate the temporal relationship that the operator perceived when the operator content was provided.

If the service provider cannot furnish an estimate of transmission delays, then server 30 can measure the delays by sending a signal to apparatus 10 that causes some recognizable event to be communicated back to server 30. If apparatus 10 includes some feature that automatically responds to certain signals, then server 30 can measure the delays without requiring operator participation. Otherwise, server 30 may measure the delays by observing the interval of time between the transmission of an instruction to apparatus 10 for the operator to take some action, such as pressing a button, and the reception of some indication from apparatus 10 that the operator took that action.

If the delays are not known precisely, then server 30 cannot precisely determine the temporal relationship perceived by the operator, which may prevent the system from exactly preserving this temporal relationship when the message is sent to a recipient or to the operator for review. If server 30 can determine the delay with a reasonable degree of accuracy, however, then it can substantially preserve the temporal relationship that was observed by the operator when the operator content was provided.

c) Listen

In step 124, the operator selects a previously created message for review. In step 125, apparatus 10 presents renditions of the operator content and the background music that was selected for that message. The presentation overlaps the rendition of the operator content with the rendition of the selected background music in such a manner that it substantially preserves the temporal relationship observed by the operator when the operator content was initially provided. This presentation continues until step 126 determines that the presentation has ended or the operator has requested termination of the presentation, such as by pressing a button. The process then continues with step 103.

d) Delete

In step 134, the operator selects a previously created message to delete. In step 135, the operator is requested to confirm the deletion. If the deletion is confirmed, the message is deleted in step 136 and the process continues with step 103. If the deletion is not confirmed, the process continues with step 103.

e) Send

In step 144, the operator selects a previously created message to send. In step 145, the operator identifies one or more recipients. In a preferred implementation for use with a cellular telephone, the operator is able to press one or more buttons on the telephone to specify a telephone number or to select a recipient from a list of telephone numbers or e-mail addresses that was previously established by the operator and stored by server 30 in storage device 33. In an alternative implementation, the operator is also able to specify an e-mail address by pressing buttons on the telephone according to known techniques to specify alphanumeric characters. Optional step 146 allows the operator to identify some additional content to be include with the message, such as text or a visual image that introduces the message to the recipient. The process then continues with step 103.

In step 147, server 30 sends a representation of the message to each recipient identified in step 145 using a delivery method that is appropriate for each recipient. The representation of the message may be delivered using a variety of methods. A "direct" method delivers the aural content of the message directly to the recipient in much the same way that so called voicemail is delivered to a voicemail subscriber. This direct method is suitable for delivery to conventional telephones or other devices that have an acoustic output transducer and little or no processing capabilities. A "notification" method delivers only a notification with instructions for retrieving the message. The notification method is suitable for delivery to essentially any type of apparatus including conventional telephones, but it is especially suitable for delivery to cellular telephones by way of SMS, for example, and to computers by way of e-mail. Vocal notifications could be sent to conventional or cellular telephones. Operators of the recipient devices can retrieve the actual message content by following the instructions included with the notification. Methods of delivery are discussed below in more detail.

The delivery method may be expressly specified in step 145 or in some cases it may be possible to infer the correct method from the recipient's identification. For example, it may be possible to infer the notification method from a recipient e-mail address, or from a telephone number of a mobile apparatus.

Regardless of the delivery method used, when the recipient ultimately receives the message's aural content, the presentation of that message content includes a rendition of operator content with a rendition of the selected background music in such a manner that it substantially preserves the temporal relationship observed by the operator when the operator content was initially provided.

Additional considerations are discussed below.

2. MusicDIY

An operator may create a MusicDIY message using a telephone, PDA or other apparatus having an array of input devices like switches and an acoustic output transducer. Preferably, the apparatus has an array of switches 21 that can be actuated by pressing a corresponding array of buttons, an acoustic output transducer 23 such as a loudspeaker, and a rasterized visual display device 24 such as an LCD panel. The operator initiates a MusicDIY process by, for example, pressing one or more buttons of apparatus 10. Apparatus 10 uses one or more of its output devices to present prompts or other information that guide the operator through the MusicDIY process, such as by presenting visual information through display device 24. If apparatus 10 is a typical mobile telephone, for example, visual display device 24 may provide only a conventional display of telephone numbers entered by the operator to assist the operator in setting up voice communication paths, as discussed below. In response, the operator uses one or more of the input devices of apparatus 10 to control the creation and distribution of the message. Preferably, tactile input is provided by pressing buttons to actuate one or more switches in the array of switches 21.

The method shown in FIG. 3 and discussed above in connection with SongMail can also be used to explain one conceptual implementation of the MusicDIY process. The description of each step given above for SongMail applies in a corresponding manner to MusicDIY and nothing more need be said except to discuss differences in step 115.

In step 115, the system presents a rendition of the selected background music through an acoustic output transducer just as is done for SongMail; however, for MusicDIY the operator does not provide aural content directly through an acoustic input transducer but instead indirectly provides aural content by actuating one or switches in the array of switches 21 in a manner that is similar to playing a musical instrument. Apparatus 10 generates a sound in response to the activation of a switch and presents that sound to the operator through acoustic output transducer 23. This allows the operator to hear the music that is created with apparatus 10 and to control the temporal relationship between the presentation of the background music and the music created by the operator.

Apparatus 10 may generate a fixed note or sound in response to the activation of a particular switch like that done by conventional musical instruments; however, in a preferred implementation, apparatus 10 changes the sound that is generated in response to the activation of a particular switch. Preferably, the sound is changed according to characteristics of the background music so that the activation of any switch in the array of switches causes apparatus 10 to generate a sound that obeys a desired musical rule. In other words, the array of switches are adaptively mapped to sounds so that the overall effect of the operator content combined with the background music will be pleasant regardless which switch is activated. In one implementation, control information is provided with the background music that indicates how and when switch-to-sound mappings are changed. This is discussed in more detail below.

C. Communication Facilities

The process shown in FIG. 3 and discussed above omits some considerations that are pertinent to implementations using various communication technologies. Some of these considerations are discussed below.

1. Server-Operator Communications

Although no particular communication facility for apparatus 10 is critical in principle to the present invention, it is anticipated that communication via cellular telephone systems will be commercially important to many applications. Techniques that can be used with several types of cellular telephone systems are discussed below. It will be apparent that many of these techniques can be used in a wide variety of combinations.

a) Sequential use of Data and Voice Communication Facilities

A first technique may be used with one or more communication systems that provide data and voice communication facilities. According to the first technique, the operator sets up an application using a data communication facility, then stops using the data communication facility and uses a voice communication facility to create message content. This first technique may be used with cellular telephone systems, for example, that do not provide concurrent access to data and voice communication facilities.

One way in which the first technique may be implemented is shown in FIG. 4. In step 201, an application "session" is established by initiating a data communication path if one is not already available and using this path to convey operator choices like the desired application (such as SongMail or MusicDIY), language, and background music. In an alternative implementation, step 201 also allows the operator to specify one or more recipients for the message that is soon to be created.

In step 202, use of the data communication path is terminated. Server 30 stores information on storage device 33 for the session that preserves any selections or other data provided by the operator during application setup. This information will be used to perform the remainder of the application session.

In step 203, the session continues by initiating a voice communication path if one is not already available. Several examples of how this may be done are described below.

In a first example, prior to terminating use of the data communication path, server 30 sends information to apparatus 10 that includes a code identifying the session and specifying a telephone number for the operator to call. For example, if it is available, SMS may be used to send this information. The voice communication path is established when the operator calls this telephone number. In response to receiving the telephone call, server 30 asks the operator to enter a session code, perhaps by pressing buttons on the telephone. Alternatively, apparatus 10 stores information that identifies the session and automatically identifies the session by sending audible signals such as DTMF tones to server 30. In either case, server 30 can obtain the session code from the voice communication channel using IVR, for example. When server 30 receives a valid session code, it continues the application session using the voice communication path.

In a second example, prior to terminating use of the data communication path, server 30 obtains a telephone number to use for calling the operator. This number may be obtained directly from the operator or from profile information stored on storage device 33 for this operator. Server 30 may ask the operator to confirm this number. The voice communication path is established when server 30 reaches the operator using this telephone number. Server 30 may then ask the operator to enter some code to confirm his or her identity, or to identify a particular session in a manner similar to that described above. When server 30 successfully contacts the operator, it continues the application session using the voice communication path.

In a third example, an application executing in apparatus 10 utilizes services such as those provided through the Wireless Telephony Application Interface (WTAI) to call server 30, establish the voice communication path, and identify the session by sending audible signals such as DTMF tones using a protocol such as WAP.

In a fourth example, prior to terminating use of the data communication path, apparatus 10 sends information to server 30 that includes a user identifier. In response to receiving the telephone call that initiates the voice communication path, server 30 automatically determines the user identifier and identifies the session. For example, if apparatus 10 is associated with a telephone number, apparatus 10 may send its associated telephone number to server 30, which is stored with other information pertaining to a session. Server 30 may determine the user identifier automatically by using features of the telephone system such as "caller ID" or automatic number identification (ANI).

In step 204, server 30 can provide prompts or instructions as desired and it may either automatically begin a presentation of the background music or wait until the operator gives a start command, such as by pressing a button on the telephone.

In step 205, server 30 receives operator content and stores it on storage device 33.

Steps 204 and 205 reiterate to continue presentation of the background music and reception of the operator content until step 206 determines that the creation process is complete. For example, this may be determined by detecting an interval of no operator input that exceeds some threshold amount of time, by receiving a particular command from the operator such as by pressing a particular button on the telephone, or when the presentation of background music has ended.

The remainder of the application process in step 207 may be implemented in a variety of ways. In one implementation, step 207 sends the created message to the recipients identified during application setup. In another implementation, step 207 allows the operator to listen to the message and perform other functions in a manner similar to that described below for the technique using only voice communications.

In yet another implementation, step 207 terminates usage of the voice communication path and continues the application session by initiating use of a data communication path. The operator may then send the message in a manner similar to that described below for the technique that uses concurrent data and voice communication facilities.

In an alternative implementation of the first technique, steps 202 and 203 are carried out in a different way. In step 202, information representing operator choices and selections is stored within apparatus 10 rather than by server 30. In step 203, an application executing in apparatus 10 utilizes services such as those provided through WTAI to call server 30, establish the voice communication path, and identify operator choices and selections by sending audible signals such as DTMF tones using a protocol such as WAP.

b) Use of Only Voice Communication Facilities

A second technique may be used with any communication system that provides voice communication facilities. According to the second technique, the operator sets up an application and creates message content using only voice communication facilities.

One way in which the second technique may be implemented is shown in FIG. 3. In step 101, a voice communication path is established if one is not already available. The remainder of the steps are performed by allowing the operator to make selections and enter commands through the voice communication path. This may be done, for example, by vocal utterances or by pressing buttons on the telephone. Server 30 may use speech recognition software to interpret vocal utterances. A convenient implementation uses the conventional dual-tone multiple-frequency (DTMF) signals to represent operator selections and commands. Alphanumeric characters may be entered via the buttons by using known techniques.

If speech recognition is used, this feature should either be suppressed or carefully controlled while the operator is providing operator content for the SongMail application. This may be done, for example, by limiting speech recognition to a limited number of reserved words that are unlikely to be uttered by the operator as operator content. Preferably, speech recognition is suppressed during this phase of the process and only DTMF signals are recognized as commands.

If DTMF recognition is used, this feature should either be suppressed or carefully controlled while the operator is providing operator content for the MusicDIY application. Preferably, if apparatus 10 permits it, all DTMF generation is suppressed during the creation phase of MusicDIY; however, one button such as the hash (#) button or star (*) button may be reserved to represent a command for stopping the creation phase. Alternatively, all buttons may be made available for input of operator content and speech recognition is made available to recognize a command to stop this phase.

c) Concurrent use of Data and Voice Communication Facilities

A third technique may be used with any communication system that provides concurrent access to data and voice communication facilities. According to the third technique, the operator sets up the use of an application using a data communication facility and then creates message content using a voice communication facility without interrupting use of the data communication facility.

One way in which the third technique may be implemented is also shown in FIG. 3. In step 101, data and voice communication paths are established as necessary if either is not already available. The remainder of the steps are performed by allowing the operator to make selections and enter commands through the data communication path, and by receiving background music through the voice communication path.

d) Use of Only Data Communication Facilities

A fourth technique uses features such as "voice over IP" that permit sending operator content through a data communication path. This allows both application setup and message creation to be performed using the data communication path.

One way in which the fourth technique may be implemented is shown in FIG. 3. In step 101, a data communication path is established if it is not already available. The remainder of the steps are performed by allowing the operator to make selections, enter commands, receive background music, and provide operator content through the data communication path.

2. Server-Recipient Communications

Although server 30 can deliver message content directly to a recipient, it is anticipated that preferred implementations will deliver only a notification of the message instead, which includes instructions for retrieving the message and could also include a an introduction or explanation from the operator who created it. This may be done in a variety of ways. No particular way is critical to the present invention.

One way to send a notification is by using a messaging service of the telephone system, such as SMS or MMS. The content of SMS messages, for example, are limited in length and can only be text; however, apparatus 10 may allow a user to mark text in the message, such as a telephone number, and use that marked text to make a telephone call. Other text, such as a message code or session code, could be marked and sent to server 30 to identify the message to retrieve. These features reduce the effort required to retrieve the message.

Another way to send a notification is by e-mail, which provides more capabilities than SMS. An e-mail message could include a Uniform Resource Locator (URL) link to a file on network 40 that contains the message to retrieve. Using a conventional browser or various e-mail software, the recipient could retrieve the message by merely using a pointing device, such as mouse, to click on the URL link. The e-mail message could also include additional content such as a graphical image that was selected by the operator who created the message.

Yet another way to send notification is by aural information. Using speech synthesis software, for example, server 30 could generate a notification that could be sent by telephone to a recipient, or could be directly stored in a recipient's voice mailbox. In one implementation, this notification could include a telephone number to call and a code that identifies the message to retrieve. In another implementation, the notification explains to the recipient that the operator, identified by name, has created a message and then asks if the recipient wishes to receive it. If the recipient affirms delivery, server 30 then delivers the message through the telephone. Server 30 may also be implemented to allow the recipient to reply to the operator with a voice message, or to forward the message to others.

The message itself may be stored or conveyed in essentially any format that is capable of representing the content.

D. Additional Features

In a preferred implementation of the MusicDIY application, apparatus 10 is adapted in synchronism with the background music so that the activation of any switch in the array of switches causes apparatus 10 to generate a sound that obeys a desired musical rule. This feature can be used so that the overall effect of the operator content combined with the background music will be pleasant regardless which switch is activated.

Apparatus 10 is adapted by changing a mapping that associates a respective switch in the array of switches with a particular sound or note. One or more mapping relationships, referred to herein as maps, can be stored a priori in apparatus 10 or they can be obtained from information that is sent with the background music.

1. Synchronization

The map that is in effect at a particular time is modified or selected from a set of maps as the background music is presented to the operator. An identification of the map to use and the time at which this map should be used is specified by control information that is received during or prior to the time the background music is received and presented to the operator. Generally, the mapping will be adapted at times that coincide with key changes or chord changes in the background music.

If the control information is received prior to presentation, it should specify the map to use and when to use it. It may specify the desired map and the corresponding time by associating a map identifier with a time within the background music such as an offset relative to the start of the music. For example, control information specifying 7 @ 37.2 could indicate apparatus 10 should begin using the seventh map from a previously stored set of maps at a point in time 37.2 seconds after the start of the background music.

If the control music is received during the presentation of the background music, it may identify only the map to be used because the time is implied by the time when the control information is received.

2. Mapping

In preferred implementations, the maps are essentially pre-determined scale structures determined according to standard music theory and based on one of five jazz/pop musical chords: Major, Dominant 7th, Minor (Dorian), Half diminished (Locrian), and Diminished.

A chord represents a series of tones called a scale. The scales of other chords can be ordered according to their "sound" or level of consonance or dissonance relative to the basic tones of a particular chord. It is not uncommon to have five or more scales that are relatively consonant with any particular chord.

The following table shows two examples of a particular chord (referred to herein as a "base chord") and another chord that is consonant with the base chord. The base chord is shown in the first column, which represents a chord that occurs in background music. The notes of the base chord are shown in the second column. Another chord that is consonant with the base chord is shown in the third column. In both examples, the consonant chord is chosen to be identical to the base chord. The notes in the scale of the consonant chord are shown in the fourth column.

| Base Chord | Base Chord Notes | Consonant Scale | Consonant Scale Notes |
| --- | --- | --- | --- |
| C Major | C E G B D | Major | C D E F G A B C |
| C Dominant 7th | C E G Bb D | Dominant 7th | C D E F G A Bb C |

Assuming apparatus 10 is a mobile telephone with a conventional 12-key pad (with buttons that are labeled 1–9,

*, 0, #), the two consonant chords can be mapped to the keypad as follows:

|   | C Major |   |   | C Dominant 7th |   |
|---|---|---|---|---|---|
| C | D | E | C | D | E |
| F | G | A | F | G | A |
| B | C | D | Bb | C | D |
| E | F | G | E | F | G |

Each time the base chord changes in the background music, the mapping should also change so that no key can create a dissonant sound or "wrong" note.

For example, suppose the first four chords of the background music are F Major, E Minor 7th (Em7), A 7th, and D Minor 7th (Dm7). Suppose further that the chosen consonant scale for each base chord is the scale of the base chord itself. The keys for these four chords could be mapped as follows:

|   | F |   |   | Em7 |   |   | A7 |   |   | Dm7 |   |
|---|---|---|---|---|---|---|---|---|---|---|---|
| F | G | A | E | F# | G | A | B | C# | D | E | F |
| Bb | C | D | A | B | C# | D | E | F# | G | A | B |
| E | F | G | D | E | F# | G | A | B | C | D | E |
| A | Bb | C | G | A | B | C# | D | E | F | G | A |

If the maps are changed in this manner as the operator presses only the "1 " key, a sequence of notes F/E/A/D would be generated.

Unfortunately, skilled musicians do not work with scales in this manner. Instead, a musician would select the most appropriate series of notes as chords in the background music change according to the chord/scale relationship, rhythmic figures, and note placements. A simple mapping of keys according to chord structure as described above is not enough to give a musically-unskilled operator a comparable performing experience.

The performing experience can be greatly enhanced by controlling the logical flow from map to map. Two different mapping relationships may be used in combination to achieve this. The first mapping relationship is the chord/scale mapping relationship described above. This mapping is pre-established by a musician. A particular relationship can be chosen by the musician according to what the musician believes is the best fit for a particular song. Alternatively, the musician can establish several relationships according to different musical styles; i.e., jazz, blues, folk, pop, and the operator given the opportunity to select the desired style. This establishes the first chord/scale mapping relationship.

The second mapping relationship controls the flow of change between different maps. This second flow relationship can also be established by a musician, or it can be automated and provided by server 30 or by apparatus 10.

Using the example shown above, the chord/scale maps are established for the four chords as explained above. The flow of change between these maps is controlled by adapting the note of each scale that is assigned to the "1" key. The note that is assigned to the "1 " key for a particular map is the same note, within one-half musical step, that is assigned to the "1" key for the preceding map. This provides the following sequence of maps:

|   | F |   |   | Em7 |   |   | A7 |   |   | Dm7 |   |
|---|---|---|---|---|---|---|---|---|---|---|---|
| F | G | A | F# | G | A | F# | G | A | F | G | A |
| Bb | C | D | B | C# | D | B | C# | D | B | C | D |
| E | F | G | E | F# | G | E | F# | G | E | F | G |
| A | Bb | C | A | B | C# | A | B | C# | A | B | C |

If the maps are changed in this manner as the operator presses only the "1 " key, a sequence of notes F/F#/F#/F would be generated. By pressing the "4" key, the operator would create a sequence of notes Bb/B/B/B.

By controlling the flow of mapping changes, the operator can better anticipate the note that will be generated by pressing a particular key and will create music that corresponds more naturally to the progression of keys that are pressed.

Alternative relationships can be used to control the flow of change between maps. For example, the third, fifth or seventh note of a chord can be assigned to the "1 " key for a particular map, and the same note is assigned to the "1" key for succeeding maps within one-half musical step. The operator may also be allowed to choose the mapping flow relationship. For example, if the mapping flow relationship aligns succeeding maps on the fifth key, the maps for the four chords shown above would map the "1" key to the notes C, C#, C# and C.

What is claimed is:

1. A method for using a handheld apparatus having one or more output devices including a rasterized visual display that present output to an operator, one or more input devices including an array of switches that receive input from the operator, a wireless transmitter, and processing circuitry that controls operation of the one or more output devices, the one or more input devices and the wireless transmitter, wherein the method comprises steps that perform the acts of:

presenting information through the rasterized visual display to the operator that assists the operator in controlling the operation of the handheld apparatus;

providing through the one or more output devices to the operator a presentation of a representation of first content;

receiving through the one or more input devices from the operator a second content that overlaps in time the presentation of first content according to a temporal relationship controlled by the operator and an identification of one or more recipients; and sending through the wireless transmitter a representation of the second content and identification of one or more recipients to a remote server that is separated in space from the handheld apparatus, and causing the remote server to send to the one or more recipients a message representing the first content and the second content arranged according to the temporal relationship.

2. The method of claim 1 that comprises receiving by wireless communication a first signal that conveys the representation of first content.

3. The method of claim 2 wherein the first signal conveys a bandwidth-compressed representation of the first content and the method comprises expanding the bandwidth-compressed representation.

4. The method of claim 2 wherein the first signal conveys an adaptive bandwidth-compressed representation of the first content having a bandwidth requirement that changes in response to characteristics of the representation of second content sent by the handheld apparatus and the method comprises expanding the adaptive bandwidth-compressed representation.

5. The method of claim 1 wherein the first content comprises music and the second content comprises vocal sounds received from the operator.

6. The method of claim 1 that comprises presenting sounds to the operator through the one or more output devices in response to actuation of the array of switches, wherein the second content comprises indications of the actuation of the array of switches by the operator.

7. The method of claim 6 that comprises adapting the sound generated in response to the activation of a particular switch within the array of switches according to characteristics of the first content.

8. The method of claim 6 that comprises adaptively enabling and disabling the handheld device to generate Dual Tone Multiple Frequency (DTMF) signals in response to the activation of the array of switches.

9. The method of claim 1 that comprises causing the remote server to add third content to the message, wherein the third content is controlled by the operator.

10. A system for generating a message, wherein the system comprises:
(a) a handheld apparatus having one or more output devices including a rasterized visual display that present output to an operator, one or more input devices including an array of switches that receive input from the operator, a first wireless transmitter, and processing circuitry that causes the handheld apparatus to:
(1) present information to the operator through the rasterized visual display that assists the operator in controlling the operation of the handheld apparatus;
(2) provide to the operator through the one or more output devices a presentation of first content;
(3) receive from the operator through the one or more input devices one or more signals representing second content that overlaps in time with the presentation of the first content according to a temporal relationship controlled by the operator and an identification of one or more recipients; and
(4) send through the first wireless transmitter a representation of the second content and identification of one or more recipients; and
(b) a server subsystem having a wireless receiver, one or more storage devices, and processing circuitry that causes the server subsystem to:
(1) receive through the wireless receiver and store by the one or more storage devices the representation of second content and identification of the one or more recipients, and
(2) send to the one or more recipients a message representing the first content and the second content arranged according to the temporal relationship.

11. The system of claim 10 wherein the server subsystem comprises a second wireless transmitter and the processing circuitry in the server subsystem causes the server subsystem to send through the second wireless transmitter to the handheld apparatus a first signal that conveys the representation of first content.

12. The system of claim 11 wherein the first signal conveys a bandwidth-compressed representation of the first content.

13. The system of claim 11 wherein the processing circuitry in the server subsystem causes the server subsystem to change bandwidth requirements of the first signal in response to characteristics of the representation of second content received from the handheld apparatus.

14. The system of claim 10 wherein the first content comprises music and the second content comprises vocal sounds received from the operator.

15. The system of claim 10 wherein the second content comprises indications of actuation of the array of switches by the operator, and the processing circuitry in the handheld device causes the handheld device to present sounds to the operator through the one or more output devices in response to the actuation of the array of switches.

16. The system of claim 15 wherein the processing circuitry in the handheld device causes the handheld device to adapt the sound generated in response to the activation of a particular switch within the array of switches according to characteristics of the first content.

17. The system of claim 15 wherein the processing circuitry in the handheld device enables and disables the handheld device to generate Dual Tone Multiple Frequency (DTMF) signals in response to the activation of the array of switches.

18. The system of claim 10 wherein the processing circuitry in the server subsystem causes the server subsystem to add third content to the message in response to information received from the handheld apparatus.

19. A server system having a wireless receiver, one or more storage devices, and processing circuitry that causes the server system to:
(a) receive through the wireless receiver one or more signals from a handheld apparatus that are generated under control of an operator of the handheld apparatus, wherein the one or more signals convey
(i) an identification of first content,
(ii) second content that overlaps in time with a presentation by the handheld apparatus of the first content, wherein the overlap is according to a temporal relationship that is controlled by the operator, and
(iii) an identification of one or more recipients;
(b) obtain information that identifies the temporal relationship; and
(c) send to the one or more recipients a message that represents the first content and the second content arranged according to the temporal relationship.

20. The system of claim 19 wherein the server system comprises a wireless transmitter and the processing circuitry in the server system causes the server system to send through the wireless transmitter to the handheld apparatus a first signal that conveys the representation of first content.

21. The system of claim 20 wherein the first signal conveys a bandwidth-compressed representation of the first content.

22. The system of claim 20 wherein the processing circuitry in the server system causes the server subsystem to change bandwidth requirements of the first signal in response to characteristics of the representation of second content received from the handheld apparatus.

23. The system of claim 19 wherein the first content comprises music and the second content comprises vocal sounds received from the operator.

24. The system of claim 19 wherein the first content comprises music and the second content represents actuation of an array of switches in the handheld apparatus by the operator.

25. The system of claim 19 wherein the remote server adds third content to the message in response to information received from the handheld apparatus.

26. A medium readable by a machine embodying a program of instructions for execution by one or more machines to perform a method for using a handheld apparatus having one or more output devices including a rasterized visual display that present output to an operator, one or more input devices including an array of switches that receive input from the operator, a wireless transmitter, and processing circuitry that controls operation of the one or more output devices, the one or more input devices and the wireless transmitter, wherein the method comprises steps that perform the acts of:

presenting information through the rasterized visual display to the operator that assists the operator in controlling the operation of the handheld apparatus;

providing through the one or more output devices to the operator a presentation of a representation of first content;

receiving through the one or more input devices from the operator a second content that overlaps in time the presentation of first content according to a temporal relationship controlled by the operator and an identification of one or more recipients; and sending through the wireless transmitter a representation of the second content and identification of one or more recipients to a remote server that is separated in space from the handheld apparatus, and causing the remote server to send to the one or more recipients a message representing the first content and the second content arranged according to the temporal relationship.

27. The medium of claim 26 that comprises receiving by wireless communication a first signal that conveys the representation of first content.

28. The medium of claim 27 wherein the first signal conveys a bandwidth-compressed representation of the first content and the method comprises expanding the bandwidth-compressed representation.

29. The medium of claim 27 wherein the first signal conveys an adaptive bandwidth-compressed representation of the first content having a bandwidth requirement that changes in response to characteristics of the representation of second content sent by the handheld apparatus and the method comprises expanding the adaptive bandwidth-compressed representation.

30. The medium of claim 26 wherein the first content comprises music and the second content comprises vocal sounds received from the operator.

31. The medium of claim 26 that comprises presenting sounds to the operator through the one or more output devices in response to actuation of the array of switches, wherein the second content comprises indications of the actuation of the array of switches by the operator.

32. The medium of claim 31 that comprises adapting the sound generated in response to the activation of a particular switch within the array of switches according to characteristics of the first content.

33. The medium of claim 31 that comprises adaptively enabling and disabling the handheld device to generate Dual Tone Multiple Frequency (DTMF) signals in response to the activation of the array of switches.

34. The medium of claim 26 that comprises causing the remote server to add third content to the message, wherein the third content is controlled by the operator.

* * * * *

(12) INTER PARTES REEXAMINATION CERTIFICATE (779th)
United States Patent
Wall

(10) Number: US 6,640,086 C1
(45) Certificate Issued: Dec. 30, 2013

(54) METHOD AND APPARATUS FOR CREATING AND DISTRIBUTING REAL-TIME INTERACTIVE MEDIA CONTENT THROUGH WIRELESS COMMUNICATION NETWORKS AND THE INTERNET

(75) Inventor: Corbett Wall, Taipei (TW)

(73) Assignee: Wall Wireless LLC, Plano, TX (US)

Reexamination Request:
No. 95/001,522, Jan. 11, 2011

Reexamination Certificate for:
Patent No.: 6,640,086
Issued: Oct. 28, 2003
Appl. No.: 09/963,348
Filed: Sep. 25, 2001

(30) Foreign Application Priority Data

May 15, 2001 (TW) ............................... 90111564 A

(51) Int. Cl.
*H04M 11/00* (2006.01)
*H04M 1/00* (2006.01)

(52) U.S. Cl.
USPC .................... 455/3.04; 348/14.01; 348/14.02; 455/466; 455/556.1; 455/566

(58) Field of Classification Search
None
See application file for complete search history.

(56) References Cited

To view the complete listing of prior art documents cited during the proceeding for Reexamination Control Number 95/001,522, please refer to the USPTO's public Patent Application Information Retrieval (PAIR) system under the Display References tab.

*Primary Examiner* — Salman Ahmed

(57) ABSTRACT

Using an apparatus like a cellular telephone, an operator is able to create a message by singing into the apparatus or by pressing buttons on the apparatus as he listens to background music presented by the apparatus. By pressing buttons, the operator is able to generate sounds as if he was playing a musical instrument. A remote server stores a representation of the operator vocal or tactile input, and sends a message to one or more recipients that renders the operator input and background music in a manner that substantially preserves the temporal relationship originally observed by the operator.

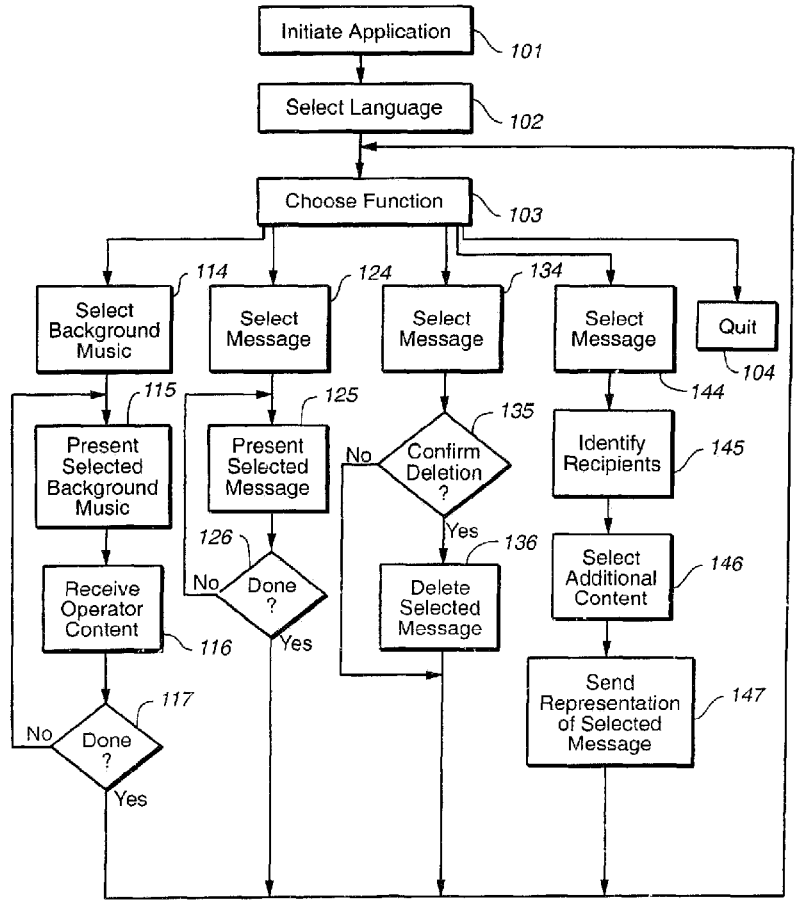

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-7, 9-16, 18-32 and 34 are cancelled.

Claims 8, 17 and 33 were not reexamined.

* * * * *